Oct. 28, 1941.  R. T. HOGG ET AL  2,260,622
ADJUSTABLE GLARE SHIELD
Filed May 22, 1940  2 Sheets-Sheet 1
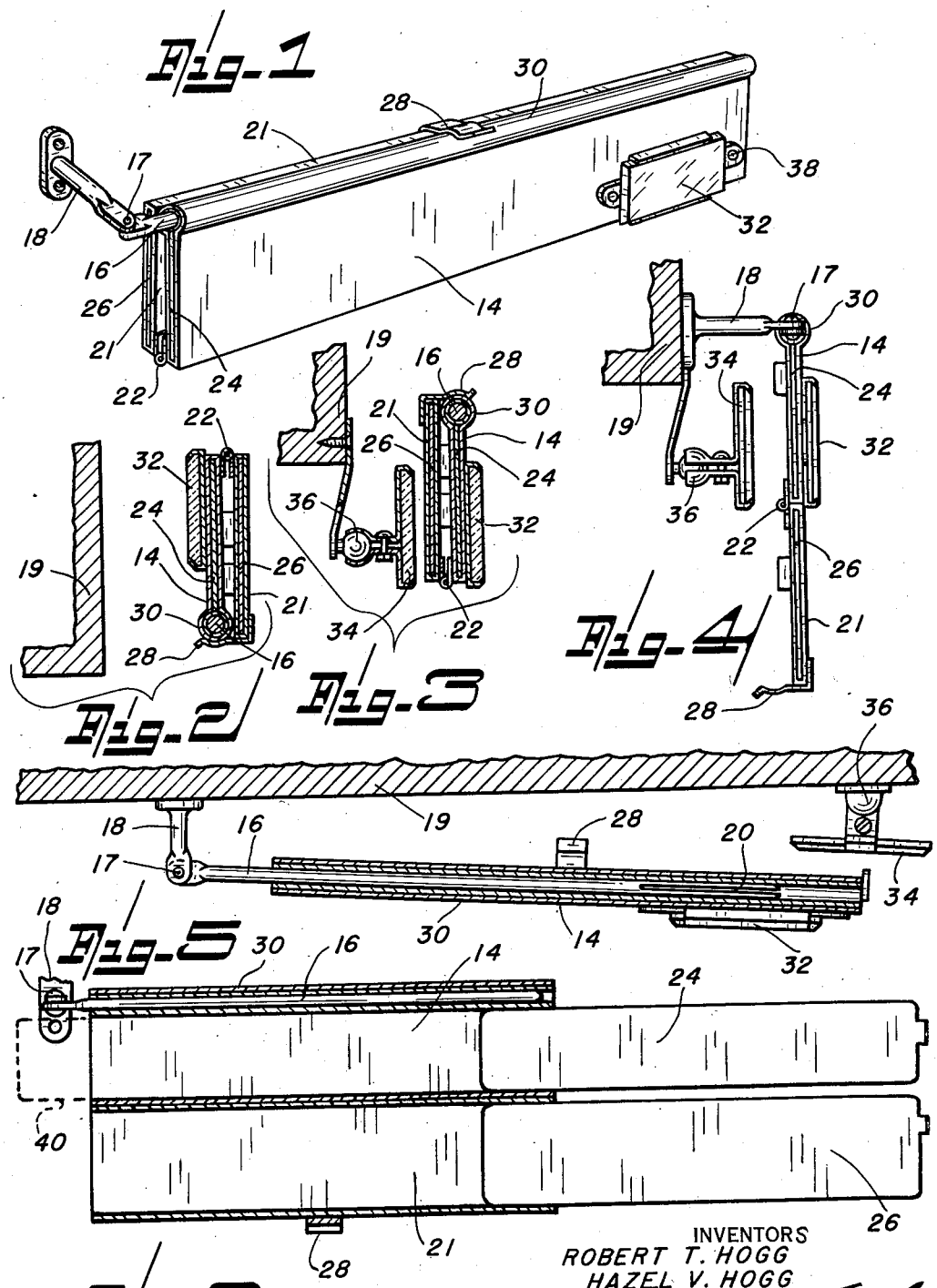
INVENTORS
ROBERT T. HOGG
HAZEL V. HOGG
BY
ATTORNEYS Oct. 28, 1941.  R. T. HOGG ET AL  2,260,622
ADJUSTABLE GLARE SHIELD
Filed May 22, 1940  2 Sheets-Sheet 2

INVENTORS
ROBERT T. HOGG
HAZEL V. HOGG
BY Smith & Tuck
ATTORNEYS

Patented Oct. 28, 1941

2,260,622

UNITED STATES PATENT OFFICE 2,260,622

ADJUSTABLE GLARE SHIELD

Robert T. Hogg and Hazel V. Hogg, Seattle, Wash.

Application May 22, 1940, Serial No. 336,664

2 Claims. (Cl. 296—97)

Our present invention relates to glare shields for automobiles and more particularly to an adjustable glare shield which, because of its construction gives full protection to the driver and a front seat passenger from reflected light, sunlight, or headlight glare coming in through the wind shield. Further, the device may be so adjusted that it will also give full protection from light coming in through the front side windows.

Our device consists essentially of a glare shield, or visor, of greater than normal length so that two shields, one pivoted on each side of the car, will go entirely across the upper portion of the wind shield. Also means are provided whereby extra depth can be had in the glare shield and extra length can be had when adjusted to a side window. We further provide a rear view mirror as a substitute for the usual mirrors which are made inoperative by the use of such long glare shields.

The principal object of our present invention is, therefore, to provide a glare shield which due to its many adaptable features, gives complete protection from glare coming from any normal source that might bother an automobile driver.

Another important object of our present invention is to provide means whereby an auxiliary rear view mirror is employed as a substitute for the usual mirror that will normally be covered by our long glare shields.

A still further object is the provision of means whereby the glare shield forms a universal mounting for the auxiliary rear view mirror making it readily adaptable both in a vertical and a horizontal plane.

A further object of our present invention is to provide within the glare shield means for more fully covering a window so as to shut out unwanted light or glare.

Other and more specific objects will be apparent from the following description taken in connection with the accompanying drawings, wherein Figure 1 is a perspective view showing our glare shield as it is normally used in front of the driver.

Figure 2 is a bracketed, sectional view showing our glare shield and the mounting base to which it is attached with the shield folded upwardly out of use.

Figure 3 is a bracketed view, in section, showing the manner in which our supplementary mirror supplants the fixed mirror normally employed in an automobile.

Figure 4 is a vertical, sectional view illustrating the manner in which our glare shield may be unfolded to give greater coverage.

Figure 5 is a plan view, in section, showing the relationship between our supplementary mirror and the mirror normally affixed to the car, and showing the tension means employed to frictionally secure our glare shield in its adjusted position.

Figure 6 is an elevation, partly in section, showing the lateral and vertical extensions of our glare shield.

Figure 7 showing the same as raised, with the normal rear view mirror in use, and Figure 8 showing our glare shield lowered with the auxiliary mirror being used instead of the conventional one.

Figure 7:
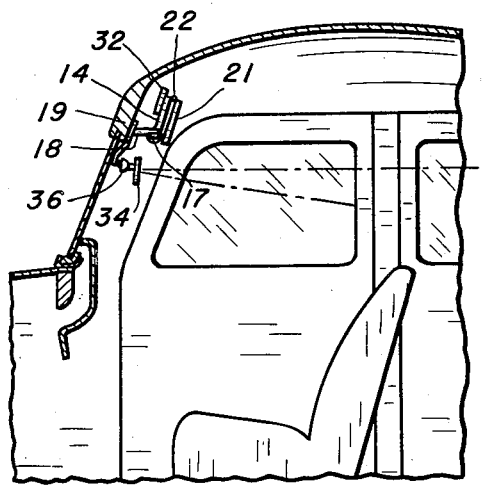
Figures 7 and 8 show the two normal positions of our glare shield in front of the driver.

Referring to the drawings, throughout which like reference characters indicate like parts, 14 designates the shield member of our glare shield. This is preferably slidably mounted on a supporting rod 16. This rod, is pivotally mounted as at 17 to a bracket 18 which, in turn, is fixedly secured to the framework of the automobile at 19. At its free end, rod 16 is split, as indicated at 20 and sprung outwardly so that it will provide a frictional engagement for the shield member that will hold it in its adjusted position about its longitudinal axis, or when the shield is turned about the longitudinal axis, as when it is folded in its upper storage position.

Hingedly secured to shield member 14 is a second shield member 21 of similar proportions. Any suitable type of hinge may be employed for this service as the hinges shown at 22. Both members 14 and 21 are formed so as to provide a recess extending the length of the same, and in these recesses are secured the shield extension members 24 and 26. As the shield is intended for use in either its half width form, as illustrated in Figure 1, or with the shield unfolded as in Figure 6, it is desirable to have some easily releasable securing means to hold the hinge member 21 in its upper position. As illustrated in Figure 1, we have provided the spring clip 28 which is secured to member 21 and has a concave portion which engages over the top of member 14 where it is provided with a tubular portion 30 that is a snug fit about rod 16.

Secured to shield member 14 is a rear view mirror 32. This mirror is preferably of approximately the same size as the mirror 34 which is normally furnished as an accessory on the automobile. Mirror 32, however, need not have the adjustable means as is shown at 36 to support mirror 34, inasmuch as the mirror can be pivoted about pin 17 and revolved in a vertical plane about rod 16. It can, therefore, be of simple, economical structure, and may be secured directly to shield 14 as by screws or rivets 38.

*Method of operation*

Figure 8:
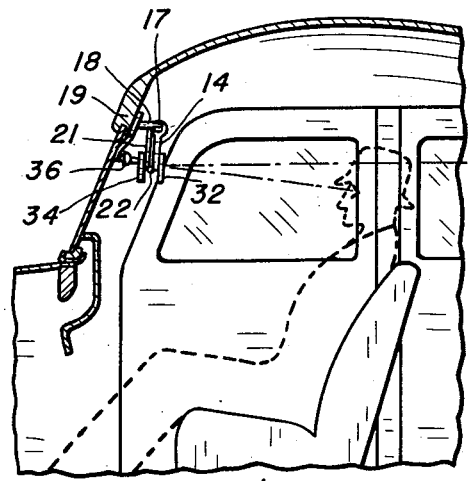
Figure 9:
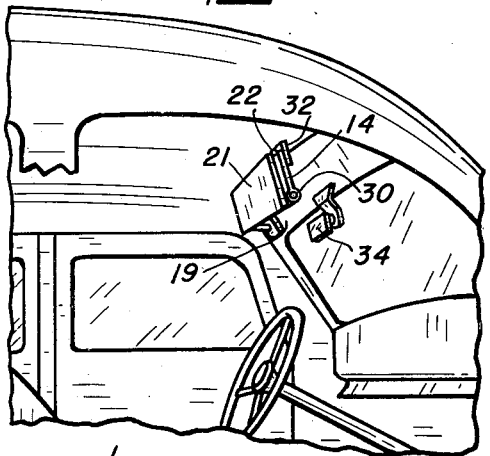
Figure 9 is a perspective view showing my glare shield raised and out of use.
Figure 12:
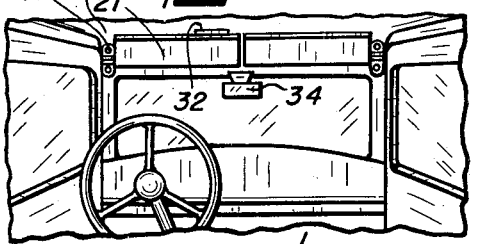
Figure 12 is a view looking toward the front of a car showing the positions normally occupied by our glare shields when they are folded upwardly out of use.

A glare shield is normally so constructed that under most driving conditions its use is not necessary, and under such conditions it must be capable of being folded upwardly above the windshield so as not to in any way interfere with normal vision. This position I have illustrated in Figures 7, 9, and 12. Under such conditions the driver of the car uses the mirror 34 that is supplied with the car. When, however, it is necessary to provide against glare, the shield is turned down after the showing of Figures 1 and 8. Now with the conventional visor or glareshield, the length of the same has been so arranged as not to interfere with the rear vision mirror. In our present shield, however, we have provided shield members 14 and 21 of sufficient length that the two opposite shields will substantially meet in the center of the car. In fact, by the employment of extension members 24 and 26, they can be made to actually overlap. Under such conditions, the rear view mirror 34 is entirely covered, and to provide rear vision, it is necessary to employ an additional or supplemental mirror at 32. We have found it most desirable, then, to employ mirror 32 so placed on shield member 14 as to be superimposed upon, and be placed in front of, the usual rear-view mirror 34. The car driver, after he has turned the visor or glare-shield down as in Figure 8, must then adjust the same slightly so that he will have the proper line of vision through mirror 32. This adjustment is easily effected by revolving member 14 about rod 16 and to vary the line of sight on the horizontal plane, the shield may be revolved slightly about pivot 17. Further, a third adjustment is possible, in that the entire visor assembly 14 and 20 may be adjusted along the length of rod 16; consequently, adequate adjustment can be obtained from mirror 32.

Figure 10:
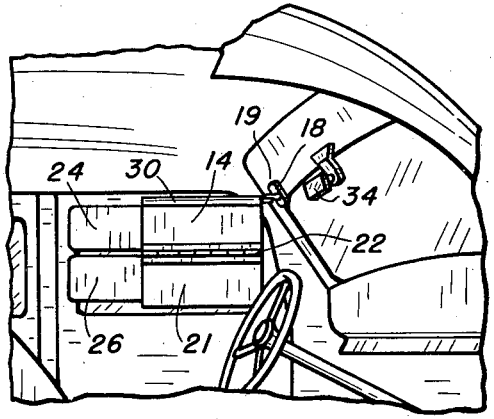
Figure 10 is a perspective view showing the manner of using our glare shield to substantially cover a front side window of a car.
Figure 11:
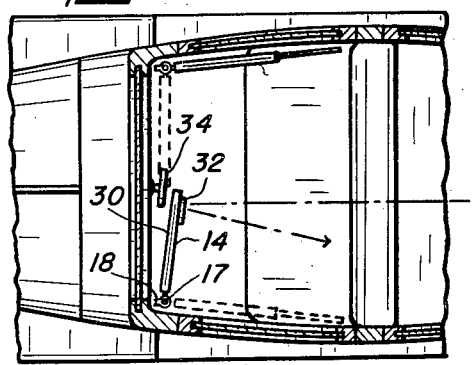
Figure 11 is a plan view, partly in section, showing the manner of using our auxiliary mirror and also showing the right hand window being covered by our device with alternate positions for each glare shield being shown in dotted lines.

In some driving positions, particularly when the sun is on the side of the car, it is often found that the usual narrow visor, even when turned to the side as illustrated in Figures 10 and 11, does not adequately protect the driver; particularly is light on the side objectionable to persons wearing glasses where a secondary glare is created by the reflection of the glasses themselves. Under such conditions, the hinged member 21 is unlatched by lifting the clip member 28 and revolving it through 180° so that it hangs down below member 14, after the showings of Figures 4, 6, and 10. If the length of the visor is now inadequate as often occurs, the additional shield members, as extension members 24 and 26, may be pulled out of their recesses in shield members 14 and 21 respectively and adjusted so as to adequately protect the person sitting in the front seat of the car. It will be noted that extension members 24 and 26 may be constructed so as to extend in either direction—to the right as shown in solid line in Figure 6, or to the left as shown in the dotted line at 40. With this arrangement it will be apparent, it is believed, that unusual adaptability of our glare shield is provided which can be made to meet practically every driving condition.

The foregoing description and the accompanying drawings are believed to clearly disclose a prefered embodiment of our invention, but it will be understood that this disclosure is merely illustrative and that such changes in the invention may be made as are fairly within the scope and spirit of the following claims.

We claim:

1. In an adjustable glare shield, the combination with a bearing rod having a split resilient portion, of a rectangular hollow main section having a tubular bearing frictionally engaging said rod, an extensible section mounted in the hollow main section movable longitudinally in either direction, a foldable rectangular hollow section hinged at the longitudinal free edge of the main section, an extensible section mounted in the foldable section and movable longitudinally in either direction, and means for securing the foldable section in folded position.

2. In an adjustable glare shield, the combination with a bearing rod having a split resilient portion, of a rectangular hollow main section having a tubular bearing frictionally engaging said rod, an extensible section mounted in the hollow main section movable longitudinally in either direction, a foldable rectangular hollow section hinged at the longitudinal free edge of the main section, an extensible section mounted in the foldable section and movable longitudinally in either direction and a spring fastening clip mounted on the free edge of the foldable section for engagement with the tubular bearing.

ROBERT T. HOGG.
HAZEL V. HOGG.